United States Patent
Lin

(10) Patent No.: US 7,390,005 B2
(45) Date of Patent: Jun. 24, 2008

(54) TUBE CONNECTION ASSEMBLY OF BICYCLE FRAME

(75) Inventor: Chun-Hung Lin, Taichung (TW)

(73) Assignee: Ideal Bike Corp., Wu chi Town, Taichung Country (TW)

(*) Notice: Subject to any disclaimer, the term of this patent is extended or adjusted under 35 U.S.C. 154(b) by 44 days.

(21) Appl. No.: 11/397,392

(22) Filed: Apr. 5, 2006

(65) Prior Publication Data

US 2007/0235976 A1 Oct. 11, 2007

(51) Int. Cl.
*B62K 3/02* (2006.01)
*B62K 19/00* (2006.01)

(52) U.S. Cl. .................................. 280/274; 280/281.1
(58) Field of Classification Search ................ 280/274, 280/281.1, 288.4

See application file for complete search history.

(56) References Cited

U.S. PATENT DOCUMENTS

| 2,729,466 | A | * | 1/1956 | Giordani | 280/281.1 |
| 4,585,247 | A | * | 4/1986 | Takada | 280/281.1 |
| 4,699,233 | A | * | 10/1987 | Koga et al. | 180/219 |
| 6,267,399 | B1 | * | 7/2001 | Buckmiller et al. | 280/274 |
| 6,481,522 | B1 | * | 11/2002 | Adachi | 180/219 |
| 6,805,373 | B2 | * | 10/2004 | Singenberger et al. | 280/281.1 |

* cited by examiner

*Primary Examiner*—Lesley D. Morris
*Assistant Examiner*—Marc A Scharich

(57) ABSTRACT

A tube connection assembly of a bicycle frame includes a bi-forked portion formed by a hollow rectangular tube; one end of the rectangular tube being bi-forked as two halves; each half having a positioning groove; and a combining portion formed by two plates which are connected as a shape corresponding to that of the positioning groove and the bi-forked portion so that in assembly the combining portion is assembled to the bi-forked portion; and connection area of the bi-forked portion and combining portion being welded.

4 Claims, 3 Drawing Sheets

TUBE CONNECTION ASSEMBLY OF BICYCLE FRAME

FIELD OF THE INVENTION

The present invention relates to bicycle frames, and in particular to a tube connection assembly of a bicycle frame, wherein the present invention provides a greater combing area between tubes, thus the strength of the bicycle frame is increased so that it can bear a heavier load. The load can be dispersed to the whole area of the connection so that the mechanical fatigue is reduced and the lifetime of the bicycle frame is prolonged.

BACKGROUND OF THE INVENTION

Conventionally, in the assembly of a bicycle frame, as illustrated in Taiwan Patent No. 584123, a bicycle frame of a bicycle, end portions of the transversal upper tube, lower tube, or rear bi-forked tube resist against and welded to a cambered surface of a longitudinal tube. Thereby the tubes are formed as a bicycle frame.

In above bicycle frame, the connection area is small so that the welding area cannot suffer from a heavy load. Thereby it is easy to have mechanical fatigue if the bicycle moves on uneven paths. Furthermore, the structure is destroyed.

In Taiwan Patent Publication with No. 527263, a manufacturing method for an aluminum frame with an integral formed multi-stub tubes is disclosed. The multi-stub tubes are used to increase the connection areas. However this prior art needs a multi-stub tube so that the many aluminum extrusion and cutting processes are necessary. Thus, the time is prolonged and cost is increased. Furthermore, this technology is particularly used to a specific structure, such as a front bi-forked tube. By a tube with at least two hollow areas, this induces many confinements and inconveniences.

SUMMARY OF THE INVENTION

Accordingly, the primary object of the present invention is to provide a tube connection assembly of a bicycle frame, wherein the present invention provides a greater combing area between tubes, thus the strength of the bicycle frame is increased so that it can bear a heavier load. The load can be dispersed to the whole area of the connection so that the mechanical fatigue is reduced and the lifetime of the bicycle frame is prolonged.

To achieve above objects, the present invention provides a tube connection assembly of a bicycle frame which includes a bi-forked portion formed by a hollow rectangular tube; one end of the rectangular tube being bi-forked as two halves; each half having a positioning groove; and a combining portion formed by two plates which are connected as a shape corresponding to that of the positioning groove and the bi-forked portion so that in assembly the combining portion is assembled to the bi-forked portion; and connection area of the bi-forked portion and combining portion being welded.

The various objects and advantages of the present invention will be more readily understood from the following detailed description when read in conjunction with the appended drawing.

DETAILED DESCRIPTION OF THE INVENTION

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
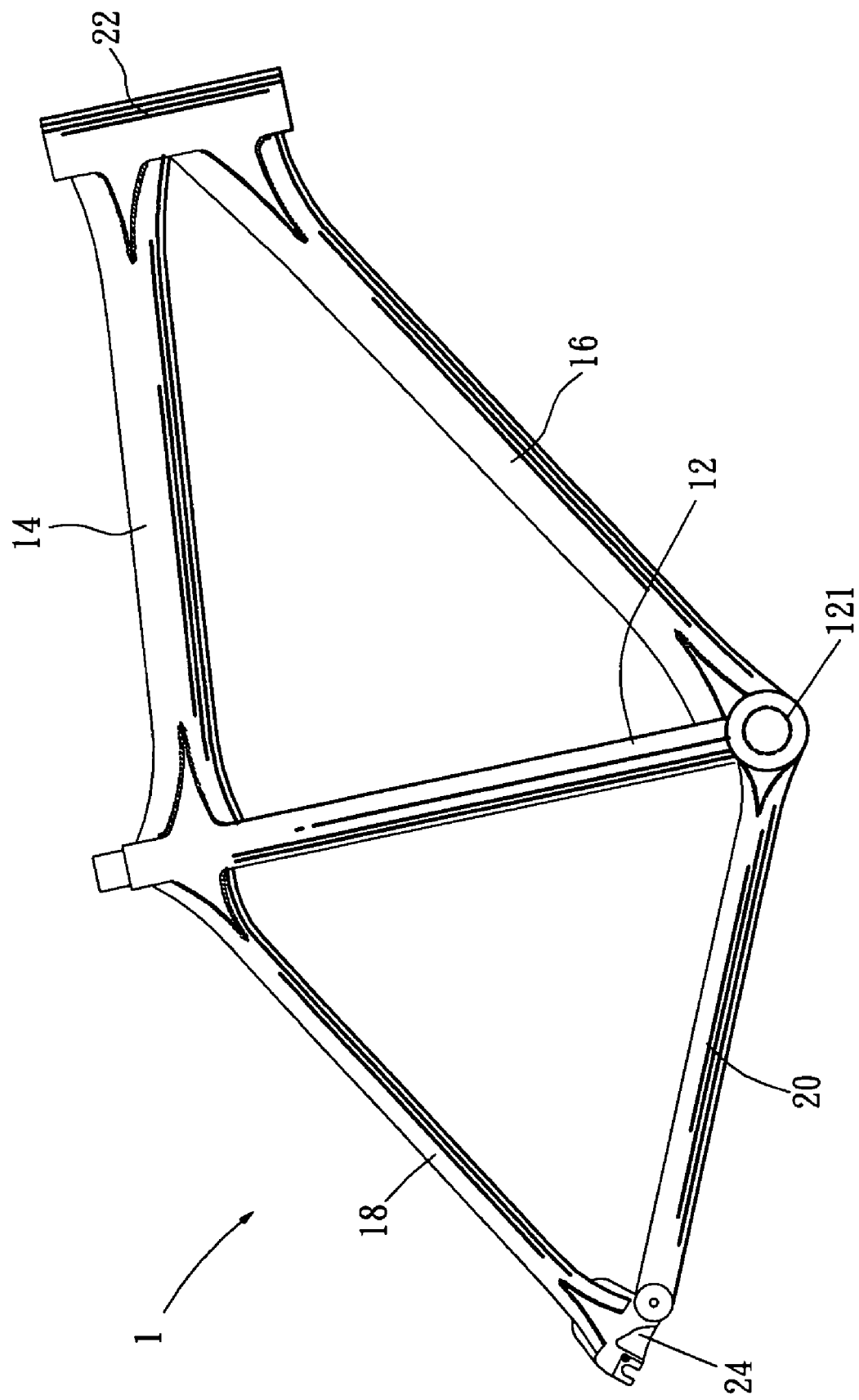
FIG. 1 is a schematic view of the bicycle frame of the present invention.

The present invention related to a tube connection assembly of a bicycle frame. As shown in FIG. 1, in generally, the bicycle frame has the following elements. A stand tube 12 has a top. A front end of the stand tube 12 is combined with an upper tube 14 and a rear end thereof is combined with a rear upper bi-forked tube 18. A five-stub tube 121 is installed at a bottom end of the stand tube 12. A front end of the five-stub tube 121 has a lower tube 16 and a rear end thereof has a rear lower bi-forked tube 20. The upper tube 14 and lower tube 16 are connected to a head tube 22 at ends far away from the stand tube 12. The rear upper bi-forked tube 18 and the rear lower bi-forked tube 20 are connected to a rear connection end 24.

Figure 2:
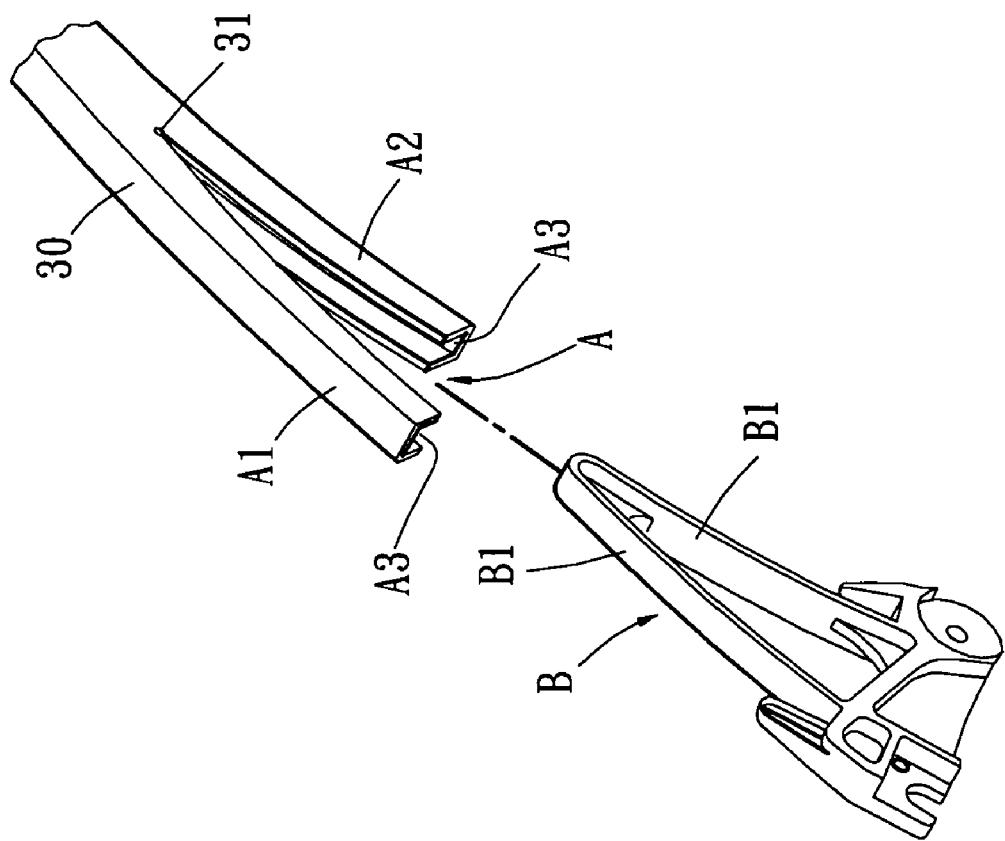
FIG. 2 is an exploded schematic view of the connection of the bicycle frame according to the present invention.

Referring to FIGS. 1 and 2, to have a great connection area in the bicycle frame 1 formed by welding a plurality of tubes, in the present invention, the upper tube 14, lower tube 16, rear upper bi-forked tube 18 and rear lower bi-forked tube 20 are formed with a V shape bi-forked portion A. The stand tube 12, five-stub tube 121, head tube 22 and rear connection end 24 are installed with a V shape combining portion B. The V shape combining portion B is engageable to the V shape bi-forked portion A. Thereby by the assembly of the bi-forked portions A and the corresponding V shape combining portion B, a bicycle frame 1 can be formed.

Figure 3:
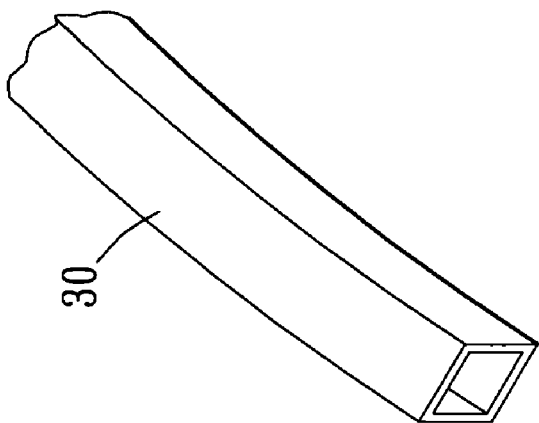
FIG. 3 is a schematic view about the bi-forked portion and combining portion of the present invention.

As illustrated in FIGS. 2 and 3, the bi-forked portion A is formed by a hollow rectangular tube 30. One end of the rectangular tube is bi-forked as two halves A1, A2. Each half has a positioning groove A3. At the connection of the two halves A1, A2 has a hole 31. In one embodiment, the tube 30 is an aluminum tube. However, the tube may have other shapes, such as hollow round tubes, or hollow elliptical tubes. In the manufacturing process, the tube 30 is firstly drilled with a hole 31. A knife serves to cut the tube 30 into two halves A1, A2. Then a punching weight serves to punch the edges of the positioning groove A3 so as to form the bi-forked portion A. The positioning groove A3 is formed as a U shape groove. The two positioning grooves A3 faces to one another.

Figure 4:
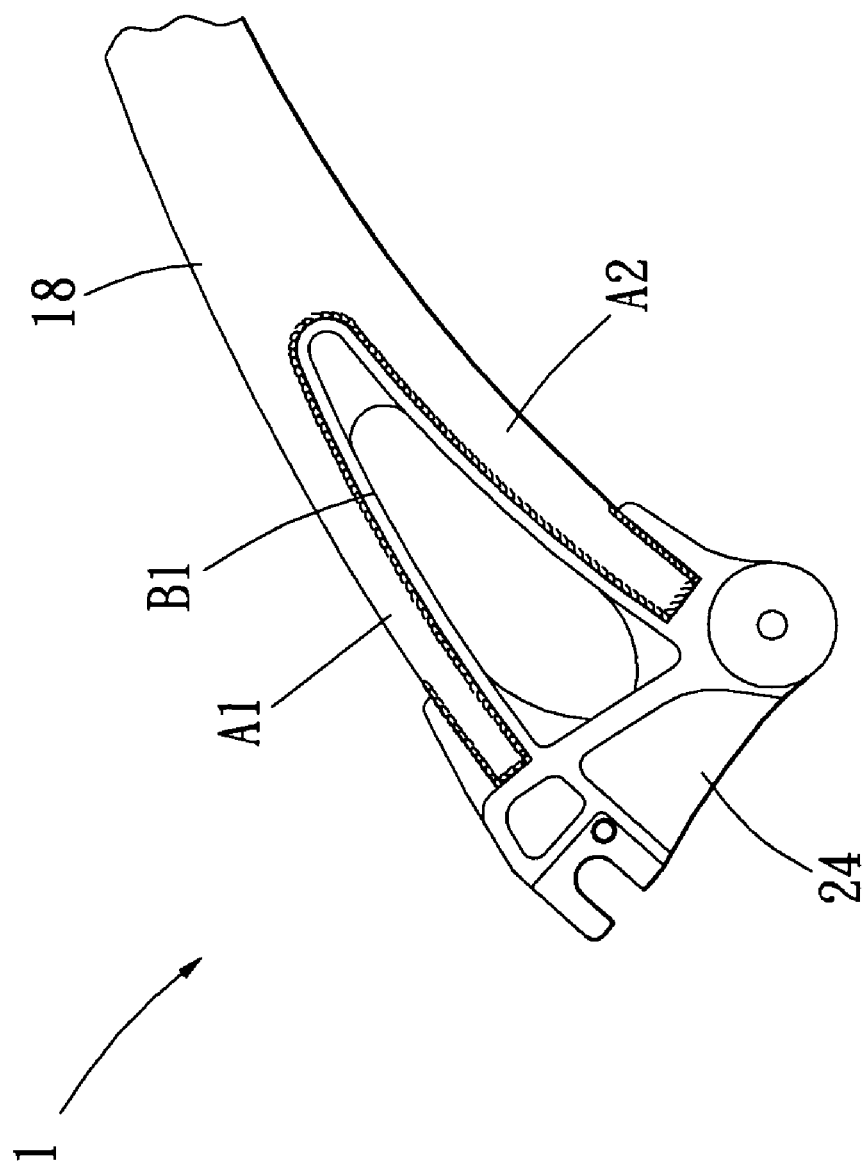
FIG. 4 is an assembly schematic view of FIG. 2.

The combining portion B is formed by two plates B1 which are connected as V shape corresponding to that of the positioning groove A3 and the bi-forked portion A so that in assembly the combining portion B can be assembled to the bi-forked portion A (referring to FIG. 4). Then connection area is welded to have a structure as illustrated in FIG. 1.

In the present invention, in the connection of the bi-forked portion A and combining portion B, the configurations and lengths of the bi-forked portion A and combining portion B can increase the connection area. Thereby the welding operation can make the tubes being firmly secured to one another. Thus the strength of the bicycle frame 1 is increased so as to bearing a heavier load. Thereby the load can be dispersed to the whole area of the connection so that the mechanical fatigue is reduced and the lifetime of the bicycle frame 1 is prolonged.

Furthermore, in the manufacturing process, the tube 30 is firstly drilled with a hole 31. A knife serves to cut the tube 30 into two halves A1, A2. Then a punching weight serves to punch the edges of the positioning groove A3 so as to form the bi-forked portion A. The positioning groove A3 is formed as a U shape groove. The manufacturing process is simple and easy and the process can be speeded greatly.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A tube connection assembly of a bicycle frame, comprising:

a stand tube (12) having a top end; a front portion of the top end of the stand tube (12) being combined with a front upper bi-forked tube (14) and a rear portion of the top end of the stand tube (12) being combined with a rear upper bi-forked tube (18); a five-stub tube (121) being installed at a bottom end of the stand tube (12); a front portion of the five-stub tube (121) being combined with a front lower bi-forked tube (16) and a rear portion of the five-stub tube (121) being combined with a rear lower bi-forked tube (20); the front upper bi-forked tube (14) and the front lower bi-forked tube (16) being connected to a head tube (22) at distal ends away from the stand tube (12); the rear upper bi-forked tube (18) and the rear lower bi-forked tube (20) being connected to a rear connection end (24);

wherein a bicycle frame (1) may be formed by welding the combined plurality of tubes together, in which the front upper bi-forked tube (14), front lower bi-forked tube (16), rear upper bi-forked tube (18) and rear lower bi-forked tube (20) are each formed with a V shaped bi-forked portion (A); and the stand tube (12), five-stub tube (121), head tube (22) and rear connection end (24) are each installed with a V shaped combining portion (B); wherein each V shaped combining portion (B) is engageable with each V shaped bi-forked portion (A), such that assembly of the bi-forked portions (A) and the corresponding V shaped combining portions (B) enable the bicycle frame (1) to be formed.

2. The tube connection assembly of a bicycle frame as claimed in claim 1, wherein each bi-forked portion (A) is formed by a hollow tube (30); the hollow tube (30) being bi-forked as two halves (A1, A2); wherein each half (A1, A2) has a U shaped like positioning groove (A3); and an enlarged hole (31) is located in an apex formed at the connection of the two halves (A1, A2) of each bi-forked portion (A).

3. The tube connection assembly of a bicycle frame as claimed in claim 2, wherein the hollow tube (30) is one of a rectangular tube, a round tube and an elliptical tube.

4. The tube connection assembly of a bicycle frame as claimed in claim 3, wherein each combining portion (B) is formed by two plates (B1) which are connected as to form the V shape corresponding to that of the positioning grooves (A3) and the bi-forked portions (A) so that in assembly, the combining portions (B) are assembled to the bi-forked portions (A).

* * * * *